United States Patent
Okahara et al.

(10) Patent No.: US 10,377,107 B2
(45) Date of Patent: Aug. 13, 2019

(54) STRUCTURE BODY AND THE MANUFACTURING METHOD

(71) Applicant: Kumi Kasei Co., Ltd., Tokyo (JP)

(72) Inventors: Etsuo Okahara, Haga-gun (JP); Koichi Ashima, Haga-gun (JP)

(73) Assignee: Kumi Kasei Co., Ltd., Tokyo (JP)

(*) Notice: Subject to any disclaimer, the term of this patent is extended or adjusted under 35 U.S.C. 154(b) by 0 days.

(21) Appl. No.: 15/752,816

(22) PCT Filed: Sep. 26, 2016

(86) PCT No.: PCT/JP2016/078187
§ 371 (c)(1),
(2) Date: Feb. 14, 2018

(87) PCT Pub. No.: WO2017/057236
PCT Pub. Date: Apr. 6, 2017

(65) Prior Publication Data
US 2018/0236749 A1    Aug. 23, 2018

(30) Foreign Application Priority Data
Sep. 29, 2015    (JP) ................................. 2015-191348

(51) Int. Cl.
*B32B 37/18*    (2006.01)
*B32B 7/14*    (2006.01)
(Continued)

(52) U.S. Cl.
CPC ................ *B32B 7/14* (2013.01); *B32B 15/06* (2013.01); *B32B 15/08* (2013.01); *B32B 15/085* (2013.01);
(Continued)

(58) Field of Classification Search
None
See application file for complete search history.

(56) References Cited

U.S. PATENT DOCUMENTS 5,163,730 A * 11/1992 Welch ................... B60R 13/025
                                                                280/751
5,740,635 A *  4/1998 Gil ......................... E04B 1/945
                                                                109/80
(Continued)

FOREIGN PATENT DOCUMENTS

EP            1 717 018 A1    11/2006
JP          05-049336 U        6/1993
(Continued)

OTHER PUBLICATIONS

International Search Report for International Application No. PCT/JP2016/078187, dated Dec. 20, 2016.

*Primary Examiner* — Callie E Shosho
*Assistant Examiner* — Daniel D Lowrey
(74) *Attorney, Agent, or Firm* — Wolf, Greenfield & Sacks, P.C.

(57) ABSTRACT

An object of the present invention is to provide a structure body, which allows the obtaining of superior impact performance while suppressing increases in thickness and weight of a plastic plate and reducing cost, and a method for manufacturing that structure body. Provided is a structure body (1) provided with a structure (10) made of a metal or a thermosetting resin, a plastic plate (14) attached to a surface (10a) of the structure (10) with double-sided tape (12), and a non-foamed plastic sheet (A) having a glass transition temperature of −20° C. or lower arranged between the structure (10) and the plastic plate (14). Also provided is a method for manufacturing the structure body (1) that includes arranging the plastic sheet (A) between the structure (10) and the plastic plate (14) when attaching the plastic plate (14) to the surface (10a) of the structure (10) with the double-side tape (12).

3 Claims, 2 Drawing Sheets

(51) Int. Cl.
    *B32B 15/08*         (2006.01)
    *B32B 27/30*         (2006.01)
    *B32B 27/32*         (2006.01)
    *B60R 13/04*         (2006.01)
    *B32B 15/06*         (2006.01)
    *B32B 15/085*        (2006.01)
    *B32B 15/20*         (2006.01)
    *B32B 25/08*         (2006.01)
    *B32B 25/16*         (2006.01)
    *B32B 27/08*         (2006.01)
    *B32B 37/00*         (2006.01)
    *B62D 25/04*         (2006.01)
    *B62D 27/02*         (2006.01)
    *B62D 29/00*         (2006.01)

(52) U.S. Cl.
    CPC .............. *B32B 15/20* (2013.01); *B32B 25/08* (2013.01); *B32B 25/16* (2013.01); *B32B 27/08* (2013.01); *B32B 27/30* (2013.01); *B32B 27/302* (2013.01); *B32B 27/304* (2013.01); *B32B 27/308* (2013.01); *B32B 27/32* (2013.01); *B32B 37/0076* (2013.01); *B32B 37/182* (2013.01); *B60R 13/04* (2013.01); *B62D 25/04* (2013.01); *B62D 27/026* (2013.01); *B62D 29/005* (2013.01); *B32B 2307/558* (2013.01); *B32B 2309/105* (2013.01); *B32B 2311/00* (2013.01); *B32B 2311/24* (2013.01); *B32B 2319/00* (2013.01); *B32B 2323/04* (2013.01); *B32B 2327/06* (2013.01); *B32B 2333/08* (2013.01); *B32B 2605/08* (2013.01); *B60Y 2304/01* (2013.01); *B60Y 2304/03* (2013.01); *B60Y 2304/05* (2013.01)

(56) References Cited

U.S. PATENT DOCUMENTS

| | | | | |
|---|---|---|---|---|
| 8,297,403 | B2 * | 10/2012 | Panozzo | B60R 13/02 |
| | | | | 181/207 |
| 8,424,953 | B2 * | 4/2013 | Kawano | B60R 13/04 |
| | | | | 296/146.5 |
| 8,714,625 | B2 * | 5/2014 | Kreye | B60R 13/04 |
| | | | | 296/1.08 |
| 9,242,534 | B2 * | 1/2016 | Im | B60J 5/0469 |
| 2011/0071635 | A1 * | 3/2011 | Zhang | B32B 15/08 |
| | | | | 623/17.11 |
| 2012/0022490 | A1 * | 1/2012 | Marche | A61F 13/15593 |
| | | | | 604/391 |
| 2014/0252804 | A1 | 9/2014 | Schmidt et al. | |
| 2014/0265448 | A1 * | 9/2014 | Bartlett | B60R 13/025 |
| | | | | 296/193.06 |
| 2014/0284954 | A1 | 9/2014 | Schmidt et al. | |
| 2014/0375073 | A1 | 12/2014 | Schmidt et al. | |
| 2015/0143986 | A1 * | 5/2015 | Tunis, III | E05G 1/026 |
| | | | | 89/36.02 |
| 2016/0325609 | A1 * | 11/2016 | Yu | B60R 13/04 |

FOREIGN PATENT DOCUMENTS

| | | |
|---|---|---|
| JP | 2001-508818 A | 7/2001 |
| JP | 2002-345875 A | 12/2002 |
| JP | 2005-537190 A | 12/2005 |
| JP | 2008-537526 A | 9/2008 |
| JP | 2009-539460 A | 11/2009 |
| JP | 2014-170899 A | 9/2014 |
| JP | 2014-527932 A | 10/2014 |
| JP | 2014-527933 A | 10/2014 |
| JP | 2014-527934 A | 10/2014 |
| WO | WO 98/17726 A1 | 4/1998 |
| WO | WO 2006/105933 A2 | 10/2006 |
| WO | WO 2007/141745 A2 | 12/2007 |

\* cited by examiner

STRUCTURE BODY AND THE MANUFACTURING METHOD

TECHNICAL FIELD

The present invention relates to a structure body and the manufacturing method.

The present application is a national stage filing under 35 U.S.C. § 371 of international application PCT/JP2016/078187, filed Sep. 26, 2016, claims priority on the basis of Japanese Patent Application. No. 2015-191348 filed in Japan on Sep. 29, 2015, the contents of which are incorporated herein by reference.

BACKGROUND ART

Products in which the surface of a plastic plate molded from ABS resin and the like is painted black color, which impart the close visual quality as the front and rear window glass surfaces, are frequently used as, for example, outer pillars mounted on the outside of "B" pillar of automobile doors. However, such outer pillars have problems such as an environmental load during painting process, high defect rate, and higher product cost.

Therefore, the painting process has been eliminated in recent years by using acrylic resin plates molded from polymethyl methacrylate and the like for use as outer pillars. However, due to the insufficient impact performance of acrylic resin plates, there are problems in terms of practical use in applying these acrylic resin plates as outer pillars as is. In particular, the problem of poor impact performance at low temperatures is significant.

A method is known for improving the impact performance of outer pillars that consists of two-color molding with ABS resin or glass fiber filled ABS resin and acrylic resin to obtain a plastic plate in which these components are laminated (Patent Documents 1 to 3). However, when the aforementioned plastic plate is used in an outer pillar, there are problems that are disadvantageous in terms of fuel consumption related to an increase in weight, as well as problems resulting in impairment of the sense of unity appearance with the window glass surface due to an increase in the amount of protrusion of the outer pillar from the glass surface caused by an increase in thickness. In addition, this is also disadvantageous in terms of cost due to the need for a special equipment for two-color molding.

PRIOR ART DOCUMENTS

Patent Documents

Patent Document 1: Published Japanese Translation No. 2014-527932 of PCT International Publication
Patent Document 2: Published Japanese Translation No. 2014-527933 of PCT International Publication
Patent Document 3: Published Japanese Translation No. 2014-527934 of PCT International Publication.

DISCLOSURE OF THE INVENTION

Problems to be Solved by the Invention

An object of the present invention is to provide a structure body, which allows the obtaining of superior impact performance without increases in thickness and weight of a plastic plate and reducing cost, and a method for manufacturing that structure body.

Means for Solving the Problems

The present invention has the configurations indicated below.

[1] A structure body provided with a structure made of a metal or a thermosetting resin, a plastic plate attached to the surface of the structure with double-sided tape, and either or both of a non-foamed plastic sheet (A) having a glass transition temperature of −20° C. or lower and a non-foamed rubber sheet (B) having a glass transition temperature of −20° C. or lower arranged between the structure and the plastic plate.

[2] The structure body of [1],wherein the plastic plate is an acrylic resin plate.

[3] The structure of [1] or [2],wherein the plastic sheet (A) is a polyethylene sheet.

[4] The structure body of any of [1] to [3],wherein a laminate, provided with a substrate composed of a plastic sheet or a thin metal plate and a rubber sheet (B) composed of unvulcanized rubber formed in shape of sheet on the substrate, is attached to the structure or the plastic plate located between the structure and the plastic plate.

[5] The structure body of [4], wherein the laminate is a plastic tape.

[6] The structure body of any of [1] to [5], wherein the thickness of the plastic sheet (A) is 0.01 mm to 0.4 mm.

[7] The structure body of any of [1] to [6], wherein the plastic plate is an outer pillar of an automobile.

[8] A method for manufacturing a structure body having a plastic plate attached to the surface of a structure made of a metal or a thermosetting resin with double-sided tape, wherein either or both of a non-foamed plastic sheet (A) having a glass transition temperature of −20° C. or lower and a non-foamed rubber sheet (B) having a glass transition temperature of −20° C. or lower are arranged between the structure and the plastic plate.

EFFECTS OF THE INVENTION

The structure body of the present invention allows the obtaining of superior impact performance while suppressing increase in thickness and weight of a plastic plate and lower cost.

According to the method for manufacturing a structure body of the present invention, a structure body is obtained that allows the obtaining of superior impact performance while suppressing increase in thickness and weight of a plastic plate and reducing the cost.

BEST MODE FOR CARRYING OUT THE INVENTION

Definitions of the following terms are applied throughout the present description and claims.

A "plastic sheet" includes a plastic sheet obtained by molding a resin into the form of a sheet by extrusion molding and the like in addition to that having a resin-based adhesive material formed in shape of sheet on the substrate.

A "rubber sheet" includes a plastic sheet obtained by molding rubber into the form of a sheet by extrusion molding and the like in addition to that having a rubber-based adhesive material formed in shape of sheet on the substrate.

The "back side" of a plastic plate refers to the side of the structure.

[Structure Body]

The structure body of the present invention is provided with a structure made of a metal or a thermosetting resin, a plastic plate attached to the surface of the structure with double-sided tape, and either or both of a non-foamed plastic sheet (A) and a non-foamed rubber sheet (B), which they will be subsequently described, located between the structure and the plastic plate.

The double-sided tape is preferably attached to the peripheral edge of the plastic plate from the viewpoint of maximizing the area on where the plastic sheet (A) and the rubber sheet (B) are located. Meanwhile, the double-sided tape is not necessarily required to be attached over the entire circumference along the peripheral edge of the plastic plate as far as the plastic plate is strictly attached to the structure when the plastic sheet (A) or rubber sheet (B) is located between the plastic plate and the structure. For example, if the plastic plate has long shape such as a rectangular shape, the double-sided tape may be attached only at longer side of the peripheral edges of the plastic plate.

The plastic sheet (A) and the rubber sheet (B) are preferably attached to the structure or to the plastic plate. Furthermore, the plastic sheet (A) and the rubber sheet (B) are not required to be attached to neither the structure nor the plastic plate when they are located between the structure and the plastic plate.

Only one of either the plastic sheet (A) or the rubber sheet (B) may be arranged between the structure and the plastic plate or both may be arranged between the structure and the plastic plate. In the case of using both the plastic sheet (A) and the rubber sheet (B), the plastic sheet (A) and the rubber sheet (B) may be arranged as a laminate.

In the case of using the plastic sheet (A), the plastic sheet (A) may be arranged as a laminate consisting of a substrate other than the rubber sheet (B) and the plastic sheet (A). Similarly, in the case of using the rubber sheet (B), the rubber sheet (B) may be arranged as a laminate consisting of a substrate other than the plastic sheet (A) and the rubber sheet (B).

The following provides an explanation of examples of the structure body of the present invention based on FIGS. 1 to 4.

Figure 1:
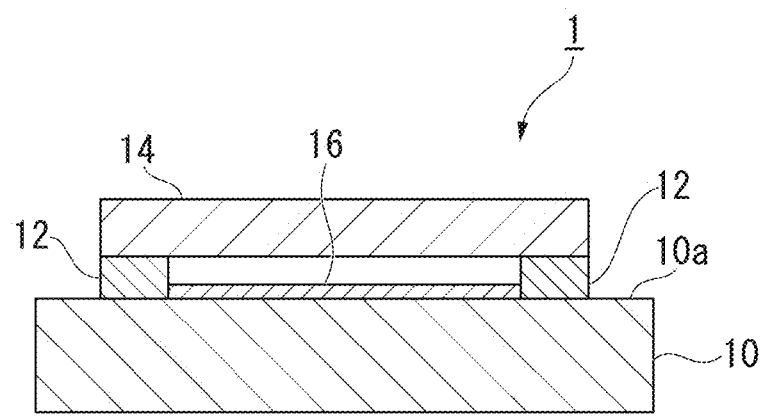
FIG. 1 is a cross-sectional view showing one example of the structure body of the present invention.

As shown in FIG. 1, a structure body 1 is provided with a structure 10, a plastic plate 14 attached to a surface 10a of the structure 10 with a double-sided tape 12, and a plastic sheet (A) 16 arranged between the structure 10 and the plastic plate 14. The double-sided tape 12 is attached to the peripheral edge of the plastic plate 14. The plastic sheet (A) 16 is arranged to the inside of the double-sided tape 12 on the surface 10a of the structure 10 when viewed from overhead. The thickness of the plastic sheet (A) 16 is less than the thickness of the double-sided tape 12, and a space is formed between the plastic sheet (A) 16 and the plastic plate 14.

Figure 2:
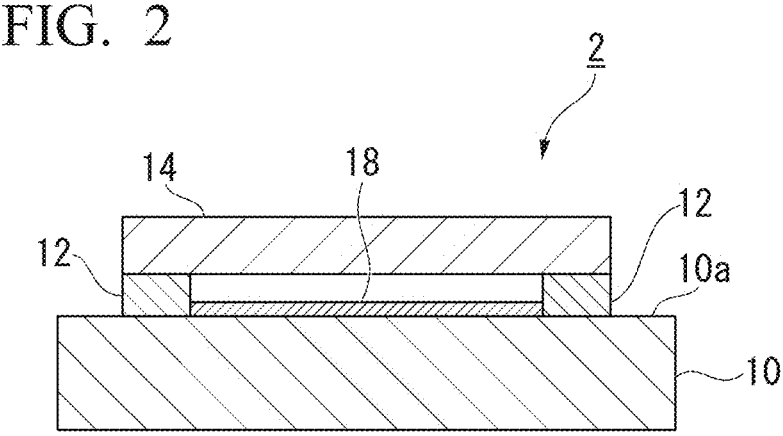
FIG. 2 is a cross-sectional view showing another example of the structure body of the present invention.

As shown in FIG. 2, a structure body 2 is provided with the structure 10, the plastic plate 14 attached to the surface 10a of the structure 10 with the double-sided tape 12, and a rubber sheet (B) 18 arranged between the structure 10 and the plastic plate 14. The structure body 2 is the same as the structure body 1 with the exception of being provided with the rubber sheet (B) 18 instead of the plastic sheet (A) 16.

Figure 3:
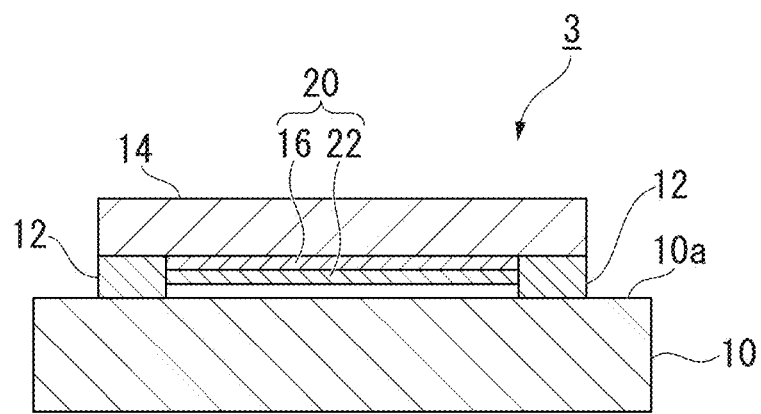
FIG. 3 is a cross-sectional view showing another example of the structure body of the present invention.

As shown in FIG. 3, a structure body 3 is provided with the structure 10, the plastic plate 14 attached to the surface 10a of the structure 10 with the double-sided tape 12, and a laminate 20 arranged between the structure 10 and the plastic plate 14. The laminate 20 is a laminate consisting of a substrate 22 and the plastic sheet (A) 16. The double-sided tape 12 is attached to the peripheral edge of the plastic plate 14, and the laminate 20 is attached to the inside of the double-sided tape 12 on the back side of the plastic plate 14 so that the plastic sheet (A) 16 faces the plastic plate 14. The thickness of the laminate 20 is less than the thickness of the double-sided tape 12 and a space is formed between the laminate 20 and the structure 10.

Figure 4:
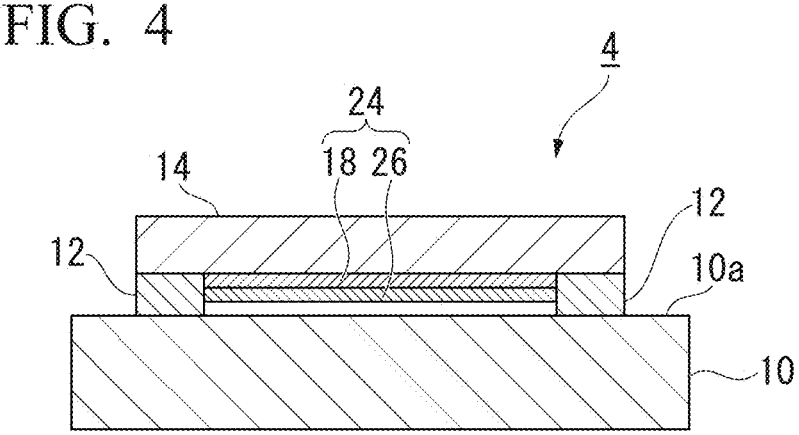
FIG. 4 is a cross-sectional view showing another example of the structure body of the present invention.

As shown in FIG. 4, a structure body 4 is provided with the structure 10, the plastic plate 14 attached to the surface 10a of the structure 10 with the double-sided tape 12, and a laminate 24 arranged between the structure 10 and the plastic plate 14. The structure body 4 is the same as the structure body 3 with the exception of being provided with the laminate 24 instead of the laminate 20. The laminate 24 is a laminate consisting of a substrate 26 and the rubber sheet (B) 18. The laminate 24 is attached to the plastic plate 14 so that the rubber sheet (B) 16 faces the plastic plate 14.

(Structure)

The structure is only required to be that made of a metal or a thermosetting resin, and examples thereof include the chassis of an automobile or motorcycle, and the housing of a refrigerator.

There are no particular limitations on the shape or size of the structure provided a plastic plate can be attached to the surface thereof with double-sided tape.

(Plastic Plate)

The present invention is particularly effective in the case the plastic plate is an outer pillar of an automobile. Furthermore, the plastic plate is not limited to an outer pillar, but rather may also be other areas of as automobile, for example, a front grille.

There are no particular limitations on the resin that forms the plastic plate, and examples thereof include acrylic resins such as polymethyl methacrylate (PMMA), polystyrene, ABS resin and polycarbonate resin. The present invention is more effective in the case of using a plastic plate having low impact performance, such as an acrylic resin plate or polystyrene plate. In addition, since an acrylic resin plate is frequently used for the outer pillar, the present invention is particularly effective in the case the plastic plate is an acrylic resin plate.

The resin that forms the plastic plate may be only one type of resin or two or more types of resin.

An additive such as a pigment, dye or anti-aging agent may be incorporated in the resin that forms the plastic plate as necessary.

The additive may be one or multiple types of additives.

The thickness of the plastic plate can be suitably set corresponding to the application.

In the case the plastic plate is an outer pillar, the thickness of the plastic plate is preferably between 1.0 mm to 3.5 mm and more preferably between 1.5 mm to 2.0 mm. If the thickness of the plastic plate is 1.0 mm or more, simultaneous to ensuring a level of rigidity required for practical use, superior impact performance is easily obtained. If the thickness of the plastic plate is 3.5 mm or less, the amount of protrusion of the outer pillar from the glass surface is reduced, thereby improving the sense of unity appearance with the glass surface.

(Double-sided Tape)

There are no particular limitations on the double-sided tape and a known double-sided tape can be used. Examples of double-sided tape include known double-sided tape used to attach to the outer pillar of an automobile.

The thickness of the double-sided tape is preferably between 0.4 mm to 1.5 mm, and more preferably between 0.6 mm to 1.0 mm. If the thickness of the double-sided tape is 1.5 mm or less, impairment of the sense of unity appearance with the glass surface and a decrease in cold impact performance can be avoided, and if the thickness is 0.4 mm or more, pressure during adhesion can be applied uniformly resulting in adequate adhesive strength.

(Plastic Sheet (A))

The plastic sheet (A) is a non-foamed plastic sheet having a glass transition temperature (Tg) of −20° C. or lower.

The plastic sheet (A) having a Tg of −20° C. enables the plastic sheet (A) to demonstrate favorable cushioning in an environment exceeding −20° C. Consequently, damage to the plastic plate can be inhibited by alleviating shock acting on the plastic plate in an environment exceeding −20° C. In addition, since the resin (A) is not foamed, the plastic sheet (A) is more resistant to local deformation in comparison with foamed sheets. Consequently, when a shock force acts on the plastic plate, local deformation that exceeds the breaking elongation is inhibited from occurring in the plastic plate. On the basis thereof, arranging the plastic sheet (A) between the plastic plate and structure makes it possible to inhibit the occurrence of damage to the plastic plate when shock acts on the plastic plate.

The Tg of the plastic sheet (A) is −20° C. or lower, preferably −30° C. or lower, and more preferably −50° C. or lower. The lower the Tg of the plastic sheet (A), the greater the degree to which damage to the plastic plate can be inhibited in environments at lower temperatures.

Furthermore, Tg in the present invention refers to the mid-point glass transition temperature as measured by differential scanning calorimetry (DSC).

The plastic sheet (A) is only required to be a plastic sheet having a Tg of −20° C. or lower, and examples thereof include a polyethylene sheet (Tg: −120° C.) and a polyoxymethylene sheet (Tg: −50° C.). Among these, a polyethylene sheet is preferable from the viewpoints of being inexpensive and readily available as well as allowing the effect of minimizing damage to the plastic plate to be easily obtained.

A sheet molded by a known method such as extrusion molding can be used for the plastic sheet (A). Furthermore, that having an adhesive material composed of a resin having a Tg of −20° C. or lower formed in the form of a sheet on a substrate may also be used for the plastic sheet (A). Namely, a laminate (to also be referred to laminate (α)) consisting of a substrate and the plastic sheet (A), obtained by forming an adhesive material having a Tg of −20°C. or lower in the form of a sheet, may be used for the plastic sheet (A).

Examples of the substrate in the laminate (α) include the plastic sheet (A) composed of a molded sheet obtained by extrusion molding and the like, a plastic sheet other than the plastic sheet (A) (such as a soft vinyl chloride sheet), the rubber sheet (B), a rubber sheet other than the rubber sheet (B), and a thin metal plate.

In the case of using a thin metal plate for the substrate, the laminate (α) is preferably arranged between the structure and the plastic plate so that the plastic sheet (A) is facing the plastic plate from the viewpoint of allowing the effect of inhibiting damage to the plastic plate to be easily obtained.

The thickness of the plastic sheet (A) is preferably less than the thickness of the double-sided tape. As a result, forces acts more easily on the portion of the double-sided tape when attaching the plastic plate to the structure, and it becomes easy to securely fasten the plastic plate to the structure. In the case of using the laminate (α), the thickness of the laminate (α) is preferably less than the thickness of the double-sided tape.

The thickness of the plastic sheet (A) is preferably between 0.01 mm to 0.4 mm, and more preferably between 0.02 mm to 0.2 mm, within a range that is less than the thickness of the double-sided tape. If the thickness of the resin sheet (A) is 0.01 mm or more, the effect of minimizing damage to the plastic plate is easily obtained. If the thickness of the plastic sheet (A) is 0.4 mm or less, the plastic plate is easily attached to the structure.

The ratio of the thickness of the plastic sheet (A) to the thickness of the double-sided tape is preferably 1.25% to 50% and more preferably 2.5% to 25%. If the aforementioned ratio is 1.25% or more, the effect of minimizing damage to the plastic plate is easily obtained. If the aforementioned ratio is 50% or less, the plastic plate is easily attached to the structure.

In the case of using the laminate (α), the ratio of the thickness of the laminate (α) to the thickness of the double-sided tape is preferably within the aforementioned ranges.

In the case of arranging the plastic sheet (A) or the laminate (α) between the structure and the plastic plate, the proportion of the plastic sheet (A) that occupies the area of the plastic plate when viewed from overhead is preferably 40% to 99%, more preferably 50% to 90%, and even more preferably 60% to 90%. If the proportion of the area of the plastic plate occupied by the plastic sheet (A) is 40% or more, the effect of minimizing damage to the plastic plate is easily obtained. If the proportion of the area of the plastic plate occupied by the plastic sheet (A) is 99% or less, a region on the plastic plate for attaching the double-sided tape is easily secured, thereby making it easy to securely attach the plastic plate to the structure with the double-sided tape.

In the case of using the plastic sheet (A), the number of plastic sheets (A) arranged between the structure and the plastic plate is preferably 1, from the viewpoint of workability. Furthermore, the number of plastic sheets (A) arranged between the structure and the plastic plate may also be 2 or more.

(Rubber Sheet (B))

The rubber sheet (B) is a non-foamed rubber sheet having a glass transition temperature (Tg) of −20° C. or lower.

As a result of the rubber sheet (B) having a Tg of −20° C. and not being foamed, the occurrence of damage to the plastic plate is minimized when a shock force acts on the plastic plate for the same reason as the plastic sheet (A).

Tg of the rubber sheet (B) is −20° C. or lower, preferably −30° C. or lower, and more preferably −40° C. or lower. The lower the Tg of the rubber sheet (B), the greater the degree to which damage to the plastic plate can be minimized in environments at lower temperatures.

The rubber sheet (B) is only required to be a rubber sheet having a Tg of −20° C. or lower, and is preferably a rubber sheet obtained by forming unvulcanized rubber having a Tg of −20° C. or lower into the form of a sheet on a substrate. Namely, a laminate (to be referred to as laminate (β)) consisting of a substrate and the rubber sheet (B), obtained by forming unvulcanized rubber having a Tg of −20° C. or lower into the form of a sheet, may be used for the rubber sheet (B).

Examples of unvulcanized rubber include polyisoprene rubber-based adhesive (Tg: −73° C.) and polybutadiene rubber (Tg: −90° C.)

The substrate in the laminate (β) is preferably a plastic sheet or thin metal plate. The plastic sheet used for the substrate may be the plastic sheet (A) or a plastic sheet other than the plastic sheet (A) such as a soft vinyl chloride sheet. In the case of using a thin metal plate for the substrate, the laminate (β) is preferably arranged between the structure and the plastic plate so that the rubber sheet (B) faces the plastic plate from the viewpoint of easily obtaining the effect of minimizing damage to the plastic plate.

The laminate (β) is preferably plastic tape.

Furthermore, the rubber sheet (B) may also be a molded sheet obtained by molding rubber having a Tg of −20° C. or lower by extrusion molding and the like.

The thickness of the rubber sheet (B) is preferably less than the thickness of the double-sided tape. As a result, force easily acts on the portion of the double-sided tape when attaching the plastic plate to the structure, and it becomes easy to securely fasten the plastic plate to the structure. In the case of using the laminate (β), the thickness of the laminate (β) is preferably less than the thickness of the double-sided tape.

The thickness of the rubber sheet (B) is preferably 0.01 mm to 0.4 mm, and more preferably 0.01 mm to 0.2 mm, within a range that is less than the thickness of the double-sided tape. If the thickness of the rubber sheet (B) is 0.01 mm or more, it becomes easy to manufacture a sheet and the effect of minimizing damage to the plastic plate is easily obtained. If the thickness of the rubber sheet (B) is 0.4 mm or less, the plastic plate is easily attached to the structure.

The ratio of the thickness of the rubber sheet (B) to the thickness of the double-sided tape is preferably 1.25% to 50%, and more preferably 1.25% to 25%. If the aforementioned ratio is 1.25% or more, the effect of minimizing damage to the plastic plate is easily obtained. If the aforementioned ratio is 50% or less, the plastic plate is easily attached to the structure.

In the case of using the laminate (β), the ratio of the thickness of the laminate (β) to the thickness of the double-sided tape is preferably within the aforementioned. ranges.

In the case of arranging the rubber sheet (B) or the laminate (β) between the structure and the plastic plate, the proportion of the rubber sheet (B) that occupies the area of the plastic plate when viewed from overhead is preferably 40% to 99%, more preferably 50% to 90%, and even more preferably 60% to 90%. If the proportion of the area of the plastic plate occupied by the rubber sheet (B) is 40% or more, the effect of minimizing damage to the plastic plate is easily obtained. If the proportion of the area of the plastic plate occupied by the rubber sheet (B) is 99% or less, a region on the plastic plate for attaching the double-sided tape is easily secured, thereby making it easy to securely attach the plastic plate to the structure with the double-sided tape.

In the case of using the rubber sheet (B), the number of rubber sheets (B) arranged between the structure and the resin plate is preferably 1 from the viewpoint of workability. Furthermore, the number of rubber sheets (B) arranged between the structure and the plastic plate may also be 2 or more.

In the structure body of the present invention as explained above, arranging the plastic sheet (A) or the rubber sheet (B) between the structure and the plastic plate prevents the plastic plate from colliding with the structure when a shock acts on the plastic plate. Damage to the resin plate is minimized due to cushioning provided by the plastic sheet (A) or the rubber sheet (B). Consequently, even in the case of a plastic plate composed of acrylic resin or polystyrene that is inferior with respect to shock resistance, the occurrence of damage to the plastic plate can be minimized when a shock force acts, thereon without having to laminate a resin (such as ABS resin) having a high impact performance.

In addition, in the structure body of the present invention, since it is not necessary to laminate a resin having a high impact performance, even in the case of a plastic plate that uses a resin having inferior impact performance, the plastic plate can be prevented from becoming excessively thick or excessively heavy. In addition, the structure body of the present invention is also advantageous in terms of cost since special equipment for carrying out two-color molding and the like is not required.

In addition, in the present invention, the plastic plate is attached to the structure with double-sided tape. In applications requiring a high level of adhesive strength such as the attachment of an outer pillar of an automobile, it is necessary to use an expensive adhesive material having very high adhesive strength. Since double-sided tape is sufficient if it is attached to the peripheral edge of the plastic plate, the structure body of the present invention is also advantageous in terms of cost in comparison with an aspect in which an adhesive material is coated over the entire surface of the plastic sheet (A) or the rubber sheet (B) and the plastic plate is attached to the structure with the sheet interposed there between.

Furthermore, the structure body of the present invention is not limited to the aforementioned structure bodies 1 to 4.

For example, the structure body of the present invention may be a structure body in which the plastic sheet (A) or the rubber sheet (B) is attached to the plastic plate. In addition, the structure body of the present invention may be that in which the laminate (α) or the laminate (β) is attached to the structure.

Method for Manufacturing Structure Body

The method for manufacturing a structure body of the present invention is a method for manufacturing the previously described structure body of the present invention.

In the method for manufacturing a structure body of the present invention, either or both of the plastic sheet (A) and the rubber sheet (B) are arranged between the structure and the plastic plate when attaching the plastic plate to the surface of the structure.

There are no particular limitations on the method used to arrange the plastic sheet (A) and the rubber sheet (B) between the structure and the plastic plate. For example, in the case of using the plastic sheet (A) alone, the plastic sheet (A) may be attached to the back side of the plastic plate, or the plastic sheet (A) may be attached to the surface of the structure. This applies similarly to the case of using the laminate (α), the rubber sheet (B) alone and the laminate (β).

In addition, there are no particular limitations on the method used to attach the plastic sheet (A) or the rubber sheet (B) to the structure or plastic plate, and for example, a method may be employed in which the plastic sheet (A) or the rubber sheet (B) is attached using an adhesive material. In the case the plastic sheet (A) or the rubber sheet (B) has adhesiveness, the plastic sheet (A) or the rubber sheet (B) may be attached as is.

Furthermore, the plastic sheet (A) and the rubber sheet (B) are not necessarily required to be attached to the structure or plastic plate.

According to the method for manufacturing a structure body of the present invention as explained above, since the plastic sheet (A) or the rubber sheet (B) is arranged between the structure and the plastic plate, impact performance of the resulting structure body is improved and the occurrence of damage to the plastic plate is minimized even if a shock acts on the plastic plate.

EXAMPLES

Although the following provides a detailed explanation of the present invention through examples thereof, the present invention is not limited by the following descriptions.

[Materials Used]

Materials used in the present examples are as indicated below.

(Plastic Sheet (A))

A-1: Polyethylene sheet (thickness: 0.09 mm, Tg: −120°C.)

A-2: Polyethylene sheet (thickness: 0.02 mm, Tg: −120° C.)

(Rubber Sheet (B))

B-1: Rubber sheet (thickness: 0.01 mm) obtained by forming a polyisoprene-based adhesive material (Tg: −73° C.) in the form of a sheet on a substrate (Substrate)

C-1: Soft vinyl chloride sheet (thickness: 0.14 mm)
C-2: Release paper (thickness: 0.11 mm)

(Sheet (X))

X-1: Rubber sheet obtained by forming an acrylic-based adhesive material (Tg: −15° C.) into the form of a sheet on a substrate X-2: Polyethylene terephthalate sheet: (thickness: 0.02 mm, Tg: 69° C.)

X-3: Polypropylene sheet (thickness: 0.25 mm, Tg: −18° C.)

X-4 Nylon 6 sheet (thickness: 0.25 mm, Tg: 50° C.)

X-5: Polyethylene foam sheet: (trade name: "Miramat", JSP Corp., thickness: 1 mm)

(Plastic Plate)

D-1: Acrylic resin plate obtained by molding polymethyl methacrylate (trade name: "FT8", Daicel-Evonik Ltd.) into a thick sheet having a thickness of 1.5 mm D-2: Acrylic resin plate obtained by molding polymethyl methacrylate (trade name: "FT8", Daicel-Evonik Ltd.) into a thick sheet having a thickness of 2.0 mm D-3: Polystyrene plate having a thickness of 2 mm

[Falling Ball Test]

The state of a plastic plate was confirmed visually when a steel ball having a diameter of 63.5 mm and weight of 1 kg was allowed to freely fall onto a structure body obtained in each of the examples from directly overhead the plastic plate in an environment at −30° C., and evaluated according to the criteria indicated below. The height at which the steel ball was dropped during the falling ball test was 10 cm, 20 cm, 30 cm, 40 cm or 50 cm.

A: No damage to the plastic plate observed
B: Damage to the plastic plate observed Example 1

Plastic sheet A-1 was arranged on an aluminum plate having a flat surface and thickness of 20 mm followed attaching the plastic plate D-1 to the aluminum plate with double-sided tape having a thickness of 0.8 mm so that the plastic sheet A-1 was interposed between the aluminum plate and the plastic plate D-1 to obtain a structure body. The interval between the double-sided tape having the plastic sheet A-1 interposed there between was 70 mm.

Example 2

A structure body was obtained in the same manner as Example 1 with the exception of using plastic sheet A-2 instead of plastic sheet A-1.

Example 3

Double-sided tape for office use having rubber sheet X-1 formed on substrate C-2 (trade name: "Nicetack", Nichiban Co., Ltd.) was attached to the back side of plastic plate D-2 followed by peeling off substrate C-2 and attaching to plastic sheet A-1. Next, the laminate was attached to an aluminum plate having a flat surface and thickness of 20 mm with double-sided tape having a thickness of 0.8 mm so that the rubber sheet X-1 and the plastic sheet A-1 were interposed between the aluminum plate and plastic plate D-2 to obtain a structure body.

Example 4

Plastic tape (Hokusetsu Corp.) having rubber sheet B-1 formed on substrate C-1 was attached to the back side of plastic plate D-1. Next, this laminate was attached to an aluminum plate having a flat surface and thickness of 20 mm with double-sided tape having a thickness of 0.8 mm so that the rubber sheet B-1 and substrate C-1 were interposed between the aluminum plate and the plastic plate D-1 to obtain a substrate body.

Example 5

Plastic tape (Hokusetsu Corp.) having rubber sheet B-1 formed on substrate C-1 was attached to an aluminum plate having a flat surface and thickness of 20 mm. Next, plastic plate D-1 was attached with double-sided tape having a thickness of 0.8 mm so that the substrate C-1 and rubber sheet B-1 were interposed between the aluminum plate and the plastic plate D-1 to obtain a structure body.

Example 6

A structure body was obtained in the same manner as Example 1 with the exception of using plastic plate D-3 instead of plastic plate D-1 and using plastic sheet A-2 instead of plastic sheet A-1.

Example 7

A structure body was obtained in the same manner as Example 4 with the exception of using plastic plate D-3 instead of plastic plate D-1.

Comparative Example 1

A structure body was obtained in the same manner as Example 1 with the exception of not using plastic sheet A-1.

Comparative Example 2

A structure body was obtained in the same manner as Example 1 with the exception of not using plastic sheet A-1 and using plastic plate D-2 instead of plastic plate D-1.

Comparative Example 3

A structure body was obtained in the same manner as Example 3 with the exception of attaching double-sided tape for office use having rubber sheet X-1 formed on substrate C-2 (trade name: "Nicetack", Nichiban Co., Ltd.) to the back side of plastic plate D-2 followed by attaching plastic sheet A-1 without peeling off substrate C-2.

Comparative Example 4

A structure body was obtained in the same manner as Example 1 with the exception of not using plastic sheet A-1 and attaching plastic sheet X-2 to the back side of plastic plate D-2.

Comparative Example 5

A structure body was obtained in the same manner as Example 1 with the exception of not using plastic sheet A-1 and attaching plastic sheet X-3 to the back side of plastic plate D-2.

Comparative Example 6

A structure body was obtained in the same manner as Example 1 with the exception of not using plastic sheet A-1 and attaching plastic sheet X-4 to the back side of plastic plate D-2.

Comparative Example 7

A structure body was obtained in the same manner as Example 1 with the exception of using sheet X-5 instead of plastic sheet A-1 and using plastic plate D-2 instead of plastic plate D-1.

Comparative Example 8

A structure body was obtained in the same manner as Example 1 with the exception of not using plastic sheet A-1 and using plastic plate D-3 instead of plastic n plate D-1.

The configurations and evaluation results of the structure bodies of the examples and comparative examples are shown in Table 1.

Furthermore, in Table 1, "PMMA" refers to polymethyl methacrylate and "PS" refers to polystyrene. "X-1/A-2" means that sheet X-1 and sheet A-2 are arranged in that order starting from the plastic plate side, and this applies similarly to other notations such as "B-1/C-1".

TABLE 1

|  | Plastic Plate | | | | Dropping Height in Falling Ball Test (cm) | | | | |
| --- | --- | --- | --- | --- | --- | --- | --- | --- | --- |
|  | Type | Material | Thickness (mm) | Cushioning Material | 10 | 20 | 30 | 40 | 50 |
| Example 1 | D-1 | PMMA | 1.5 | A-1 | A | A | A | A | A |
| Example 2 | D-1 | PMMA | 1.5 | A-2 | A | A | A | A | A |
| Example 3 | D-2 | PMMA | 2 | X-1/A-2 | A | A | A | A | B |
| Example 4 | D-1 | PMMA | 1.5 | B-1/C-1 | A | A | A | A | A |
| Example 5 | D-1 | PMMA | 1.5 | C-1/B-1 | A | A | A | A | A |
| Example 6 | D-3 | PS | 2 | A-2 | A | A | A | B | B |
| Example 7 | D-3 | PS | 2 | C-1/B-1 | A | A | A | B | B |
| Comp. Ex. 1 | D-1 | PMMA | 1.5 | None | B | B | B | B | B |
| Comp. Ex. 2 | D-2 | PMMA | 2 | None | B | B | B | B | B |
| Comp. Ex. 3 | D-2 | PMMA | 2 | X-1/C-2 | B | B | B | B | B |
| Comp. Ex. 4 | D-2 | PMMA | 2 | X-2 | B | B | B | B | B |
| Comp. Ex. 5 | D-2 | PMMA | 2 | X-3 | B | B | B | B | B |
| Comp. Ex. 6 | D-2 | PMMA | 2 | X-4 | B | B | B | B | B |
| Comp. Ex. 7 | D-2 | PMMA | 2 | X-5 | B | B | B | B | B |
| Comp. Ex. 8 | D-3 | PS | 2 | None | B | B | B | B | B |

As shown in Table 1, in Examples 1 to 7, in which the plastic sheet (A) or the rubber sheet (B) is arranged between the plastic plate and an aluminum plate, the plastic plate was observed to not be damaged even if the steel ball was dropped from a height of 30 cm, thereby demonstrating superior impact performance.

On the other hand, in Comparative Examples 1, 2 and 8, in which nothing was positioned between the plastic plate and aluminum plate, and in Comparative Examples 3 to 6, in which a sheet having a Tg of higher than −20° C. was arranged between the plastic plate and aluminum plate, damage was observed in the plastic plate even when the steel ball was dropped from a height of 10 cm. In addition, in Comparative Example 7 as well, in which sheet X-5 (polyethylene foam sheet) was arranged between the plastic plate and aluminum plate, damage was observed in the plastic plate even when the steel ball was dropped from a height of 10 cm.

One of the factors behind the improved impact performance observed in Examples 1 to 7 is thought to be the contribution of the cushioning properties of the plastic sheet (A) and the rubber sheet (B).

In addition, the cause of the failure of improvement of impact performance in the case of using the foam sheet of Comparative Example 7 is thought to be as indicated below.

Although foam sheets demonstrate cushioning, they are easily deformed as a result of being locally compressed when subjected to pressure. Consequently, damage to the plastic plate is thought to have occurred as a result of being unable to completely prevent local deformation of the plastic plate when the steel ball was dropped thereon. On the basis thereof, the use of non-foamed plastic sheet (A) and rubber sheet (B) to enable prevention of local deformation of the plastic plate is thought to be a factor behind the improvement of impact performance.

INDUSTRIAL APPLICABILITY

The present invention is able to provide a structure body that allows the obtaining of superior impact performance while suppressing increases in thickness and weight of a plastic plate and reducing cost. According to the method for manufacturing a structure body of the present invention, a structure body is obtained that allows the obtaining of superior impact performance while suppressing increases in thickness and weight of a plastic plate and reducing cost.

BRIEF DESCRIPTION OF THE REFERENCE SYMBOLS

1,2,3,4 Structure body
10 Structure
12 Double-sided tape
14 Plastic plate
16 Plastic sheet (A)
18 Rubber sheet (B)
20,24 Laminate
22,26 Substrate

The invention claimed is:

1. A method of attaching an outer pillar made of an acrylic resin or a polystyrene resin to the surface of an automobile outer plate made of a metal or thermosetting resin comprising the step of:
    affixing said outer pillar to the surface of said automobile outer plate with double-sided tape,
    wherein either or both of a non-foamed plastic sheet (A) having a glass transition temperature of −20° C. or lower and a non-foamed rubber sheet (B) having a glass transition temperature of −20° C. or lower are arranged between the surface of the automobile outer plate and the outer pillar when affixing the outer pillar to the surface of the automobile outer plate.

2. The method according to claim 1, wherein the plastic sheet (A) is a polyethylene sheet.

3. The method according to claim 1, wherein a laminate, provided with a substrate composed of a plastic sheet or a thin metal plate and a rubber sheet (B) composed of unvulcanized rubber formed in the form of a sheet on the substrate, is attached to the surface of the automobile outer plate or the outer pillar between the automobile outer plate and the outer pillar when affixing the outer pillar to the surface of the automobile outer plate.

* * * * *